(12) United States Patent
Stromberg

(10) Patent No.: US 6,980,875 B1
(45) Date of Patent: Dec. 27, 2005

(54) NONPARAMETRIC CONTROL CHART FOR THE RANGE

(75) Inventor: Arnold J. Stromberg, Lexington, KY (US)

(73) Assignee: University of Kentucky Research Foundation, Lexington, KY (US)

(*) Notice: Subject to any disclaimer, the term of this patent is extended or adjusted under 35 U.S.C. 154(b) by 0 days.

(21) Appl. No.: 10/818,385

(22) Filed: Apr. 5, 2004

Related U.S. Application Data (63) Continuation of application No. 10/442,330, filed on May 21, 2003, now Pat. No. 6,718,221.

(51) Int. Cl.[7] .............................................. G06F 17/06
(52) U.S. Cl. ........................ 700/110; 700/95; 700/108; 700/109; 702/194; 706/48
(58) Field of Search .......................... 700/95, 108–110, 700/32–34, 47, 49, 51, 52, 54, 73, 74, 89, 700/96, 117; 702/194; 706/12–14, 48

(56) References Cited

U.S. PATENT DOCUMENTS

| | | | |
|---|---|---|---|
| 5,311,131 A | 5/1994 | Smith | |
| 5,467,883 A | 11/1995 | Frye et al. | |
| 5,510,976 A | 4/1996 | Tanaka et al. | |
| 5,644,232 A | 7/1997 | Smith | |
| 5,649,070 A | 7/1997 | Connell et al. | |
| 5,682,465 A | 10/1997 | Kil et al. | |
| 5,694,524 A | 12/1997 | Evans | |
| 5,737,496 A | 4/1998 | Frye et al. | |
| 5,818,231 A | 10/1998 | Smith | |
| 5,835,901 A | 11/1998 | Duvoisin, III et al. | |
| 5,841,676 A | 11/1998 | Ali et al. | |
| 5,937,372 A | 8/1999 | Gould | |
| 6,032,106 A | 2/2000 | Ishii | |
| 6,098,063 A | 8/2000 | Xie et al. | |
| 6,110,214 A | 8/2000 | Klimasauskas | |
| 6,131,076 A | 10/2000 | Stephan et al. | |
| 6,134,510 A | 10/2000 | Deco et al. | |
| 6,246,972 B1 | 6/2001 | Klimasauskas | |
| 6,363,333 B1 | 3/2002 | Deco et al. | |
| 6,396,270 B1 | 5/2002 | Smith | |
| 2002/0082495 A1 | 6/2002 | Biswal et al. | |
| 2002/0127529 A1 | 9/2002 | Cassuto et al. | |
| 2002/0169579 A1 | 11/2002 | Gould | |
| 2003/0006770 A1 | 1/2003 | Smith | |

OTHER PUBLICATIONS

"Statistical Quality Control and a Capability Analysis" Johnson et al, Apr. 2001.*

(Continued)

Primary Examiner—Leo Picard
Assistant Examiner—Michael D. Masinick
(74) Attorney, Agent, or Firm—King & Schickli, PLLC (57) ABSTRACT

A method is provided for detecting or predicting an undesired deviation in variability of at least one parameter being monitored, wherein the variation in the parameter is incrementally recorded. The method comprises establishing the number of subsets of a dataset that have a range of the difference between any two datapoints within the dataset, and computing a control chart for the range based thereon. The method accurately detects changes in variability in real time. The true distribution of the data is reflected, and the desired result is achieved without requiring an inordinate number of computations.

9 Claims, 5 Drawing Sheets

OTHER PUBLICATIONS

"Bootstrap methods in computer simulation experiments"-Russell C. H. Cheng. Institute of Mathematics and Statistics, The University of Kent at Canterbury. 1995.*

"Computer-Intensive Methods in Statistical Analysis" -Dimitris N. Politis. Jan., 1998.*

"Conditional Monte Carlo Gradient Estimation in Economic Design of Control Limits"-Fu et al, University of Maryland, Jun. 1999.*

"Control Charts Based On Generalized Poisson Model for Count Data". -He et al. 2002.*

Wang. A parametric version of jacknife-after bootstrap. Proceedings of the 1998 Winter Simulation Conference. pp. 587-591.

Duchesne et al. Jacknife and bootstrap methods in the identification of dynamic models. Journal of Process Control 11. 2001. pp. 553-564.

Biswal et al. Use of jacknife resa,pling techniques to estimate the confidence intervals of fMRI parameters. Journal of computer assisted tomography. 25. 2001. pp. 113-120.

* cited by examiner

NONPARAMETRIC CONTROL CHART FOR THE RANGE

This application is a continuation of U.S. patent application Ser. No. 10/442,330 filed May 21, 2003, now U.S. Pat. No. 6,718,221 the disclosure of which is incorporated herein by reference.

TECHNICAL FIELD

The present invention relates to monitoring of a datastream, and more specifically to real-time monitoring of a datastream wherein variability of the data parameter or parameters being monitored must be kept within certain desired limits. More particularly, the present invention provides a method for establishing a control limit for a control chart for monitoring variability in a dataset, wherein the control limits are based on jackknife histograms and further wherein the control limits for the range reflect a true distribution of data collected rather than a fictional normal distribution.

BACKGROUND OF THE INVENTION

It is known to use control charts in monitoring streams of data to identify if the mean or variability of the dataset fall outside predetermined control limits. Conventional control charts for the mean (for example, X-bar charts for control limits based on the mean) are effective for their intended purpose. In contrast, control charts for variability, which rely heavily on normality assumptions which are often violated in practice, are inaccurate and often provide erroneous indications of alterations in datastream variability (false positives and/or false negatives).

Conventional control charts for the range assume a normal distribution of data (i.e. set controls limits based on normality), and calculate parameters using a constant based on the distribution of the range. Thus, conventional control charts are symmetric, which is disadvantageous when the data obtained exhibit a skewed distribution. Disadvantageously, for equal subsample sizes, conventional (normal theory) control charts are the only control charts provided by many statistical computing packages. Accordingly, when the data distribution is not normal, conventional control charts perform poorly in assessing variability of a datastream collected and monitored in real time.

A need is therefore identified in the art for methods for real-time monitoring of variability of a datastream wherein the data are not bound by assumptions of normality. The method should provide accurate and rapid detection of such variability, and should be capable of accurately establishing new control limits for the range which reflect the true distribution of the data. The method of the present invention satisfies this need in the art, allowing monitoring of a desired data parameter or parameters with reduced risk of false positives/negatives. It will be appreciated from the following disclosure that the method allows real-time monitoring of the data parameter or parameters, and indeed further allows prediction of future alterations in the data parameter. The method achieves the desired result without requiring an inordinate number of computations, thereby improving computational efficiency.

SUMMARY OF THE INVENTION

In accordance with a first aspect of the invention, a method for detecting or predicting a deviation in variability of at least one parameter being monitored is provided. The first step in the method comprises measuring the parameter incrementally to create a dataset having a plurality of datapoints, wherein each datapoint represents an individual measured value for the parameter. Next, the datapoints within the dataset are rank-ordered. The method further includes the steps of selecting at least one subset of the dataset, wherein the subset is a predetermined number of datapoints including a high measured value and a low measured value defining a range of measured parameter values, and calculating all possible numbers of a subsample of the dataset having the range defined by the subset. These latter steps are repeated until all possible numbers of ranges have been calculated for all possible subsets of the predetermined size within the dataset to define a set of ranges. Next, the defined set of ranges is rank-ordered. A control limit is then established for the parameter, the control limit being defined by an upper limit and a lower limit wherein the upper and lower limits are a predetermined percentile of the rank-ordered set of ranges.

The method of the present invention further includes the steps of monitoring a subsequently measured parameter value to determine or predict when the parameter is approaching a value falling outside a predetermined range, and may further include taking a suitable corrective action to prevent the parameter from further variation. The parameter may be measured incrementally over a predetermined time period, or may represent incremental changes in a distance between two moving objects or a moving object and a stationary object. The control limit may be established using a jackknife method or a bootstrap method, both of which are known in the art. When using a jackknife method, the possible numbers of a subsample of the dataset having the range defined by the subset may be calculated in accordance with the formula:

$$\binom{h-g-1}{n-2}$$

where h is the highest measured value within a range, g is the lowest measured value within a range, and n is the number of observations within the subset.

When using a bootstrap method, the calculation is dependent on the relationship between the highest (h) and lowest (g) measured value in the range. If the relationship may be defined by the equation g=h, the range will be 0 for n subsamples. If the relationship between the highest measured value and the lowest measured value in a range may be defined by the equation g=h−1 where h is the highest measured value within a range and g is the lowest measured value within a range, and the control limits are defined by the range of $2^n-2$ subsets, where n is the number of observations within the subset. If the relationship between the highest measured value and the lowest measured value in a range is defined by the equation g<h−1 where h is the highest measured value within a range and g is the lowest measured value within a range, then the possible numbers of a subsample of the dataset having the range defined by the subset are calculated in accordance with the formula:

$$\sum_{c=1}^{n-1}\sum_{d=1}^{n-c}\binom{n}{c}\binom{n-c}{d}(h-g-c-d+1)^{n-c-d}$$

where n is the number of observations within the subset, c is the number of times the lowest measured value appears in the subset, and d is the number of times the highest measured value appears in the subset.

In another aspect of the present invention, a method for detecting or predicting an undesired deviation in variability of at least one parameter being monitored is provided. The method begins with incrementally recording a variation in the parameter. Next is the step of creating a dataset having a plurality of datapoints, wherein each datapoint represents an individual measured value of the parameter, followed by rank-ordering the datapoints within the dataset. After defining a predetermined subset size, for each possible value for the range of the predetermined subset size, the number of subsamples within the dataset are calculated which provide the range defined by the subset to define a set of ranges. After rank-ordering the set of all ranges, a control limit is established, the control limit being defined by an upper control limit and a lower control limit for the parameter, wherein the upper and lower control limits are a predetermined percentile of the rank-ordered set of all ranges. The method further includes the step of monitoring a subsequently measured parameter value to determine when the parameter is approaching or exceeding the control limit. As the parameter approaches or exceeds the control limit, a suitable corrective action may be taken to prevent the parameter from exceeding the control limit.

It will be appreciated that the parameter of choice may be measured incrementally over a predetermined time period, or may represent incremental changes in distance between two objects. The parameter may be any desired parameter from which a dataset having a normal or a non-normal distribution may be created. Suitable parameters or variables include those indicative of a progression of a disease condition, of a physiological condition of a patient, of a value of a currency measured over time, of a geographic orientation of an object, of a quality of a signal being transmitted, or of a measurement of a distance between a first object and a second object. It will be appreciated that the present method, by establishing an accurate control limit for incrementally measured parameters which is not subject to unwanted false positive or false negative results, allows monitoring the parameter for quality. Indeed, based on initially established limits, it is possible to predict when the parameter is approaching an undesired value, and take appropriate corrective action.

DETAILED DESCRIPTION OF THE INVENTION

As described above, it is desirable to utilize a sampling range to define control limits for variability in a measured or calculated parameter, i.e. the point at which variability in a datastream requires corrective action. It is known in the art to utilize a bootstrap method with random sampling for calculating control limits (wherein samples of a predetermined size are removed from a process stream, and subsampled to define ranges with which to establish control limits, followed by replacement of the subsamples in the larger sample). Such a method can be represented as:

1. Collecting k random samples of size n, resulting in a total of N=nk data points.
2. Selecting a random sample of size n with replacement from the N data point and compute the sample range for this new sample.
3. Repeating step 2 B times.
4. Using an appropriate percentile of the resampled ranges to establish the control limits.

It will be appreciated that the desired percentiles for use in calculating control limits are known in the art or can be ascertained without undue experimentation, and vary in accordance with the parameter or variable being evaluated. Similarly, the number of times step 2 must be repeated (B) is known in the art or can be ascertained without undue experimentation.

It is also known to use a jackknife method with random sampling for calculating control limits (wherein predetermined data samples are collected, and subsampled to define ranges with which to establish control limits, without replacement of the subsamples in the larger sample). Such a method can be represented as:

5. Collecting k random samples of size n, resulting in a total of N=nk data points.
6. Selecting a random sample of size n without replacement from the N data point and compute the sample range for this new sample.
7. Repeating step 2 B times.
8. Using an appropriate percentile of the resampled ranges to establish the control limits.

The above-referenced methods for computing control limits (confidence intervals) for the range have the drawback that they are not deterministic, i.e. that if the method is repeated on the same dataset a second time, different control limits may result. Such methods are therefore subject to providing false positive or false negative results. Accordingly, consideration was given to establishing exact range control limits based on the jackknife or bootstrap methods, calculated by the steps of:

1. Collecting k random data samples of size n, resulting in a total of N= nk data points;
2. Selecting any data sample of size n without replacement (jackknife method) or with replacement (bootstrap method) from the N data points and computing the sample range for this new sample;
3. Repeating step 2 for all possible data subsamples n; and
4. Using an appropriate percentile of the resampled ranges as the control limits.

The exact control limit method of the present invention has the advantage of being deterministic, i.e. unlike the above methods based on random sampling, repeating the analysis on the same dataset will provide the same control limits. However, given conventional computational technology, computing the ranges of all conceivable subsamples may be impossible for some datasets, or at the least require an unacceptable amount of computational time for certain applications.

Surprisingly, it has been discovered that the need to actually calculate the ranges of all possible subsamples may be avoided by rank-ordering the dataset N, represented as $x_{(1)}, x_{(2)}, \ldots x_{(N)}$, followed by counting the number of subsets of the data that have a range equalling the difference between any two datapoints within the dataset. This step is repeated for each possible range between sets of datapoints $x_{(h)}-x_{(g)}$. The method of the present invention is adaptable to both the jackknife and bootstrap methods described above. If the dataset is so ordered, for the jackknife method the range $x_{(h)}-x_{(g)}$ will be the range of:

$$\binom{h-g-1}{n-2}$$

where h is the highest measured value within a range, g is the lowest measured value within a range, and n is the number of observations within the subset.

For the bootstrap method, the calculation is dependent on the relationship between h and g. In the first case (g=h), the range will be 0 for n subsamples. If the relationship can be defined as g=h−1, then the range $x_{(h)}-x_{(g)}$ will be the range of $2^n-2$ subsets, because there are two choices for each selection, but not all the selections can be the same.

If the relationship can be defined as g<h−1, then the calculation is based on the number of times $x_g$, denoted c, appears in the subsample and the number of times $x_h$, denoted d, appears in the subsample. The range $x_{(h)}-x_{(g)}$ will be the range of:

$$\sum_{c=1}^{n-1}\sum_{d=1}^{n-c}\binom{n}{c}\binom{n-c}{d}(h-g-c-d+1)^{n-c-d}$$

where n is the number of observations within the subset, c is the number of times the lowest measured value appears in the subset, d is the number of times the highest measured value appears in the subset, h is the highest measured value within a range and g is the lowest measured value within a range.

Figure 1:
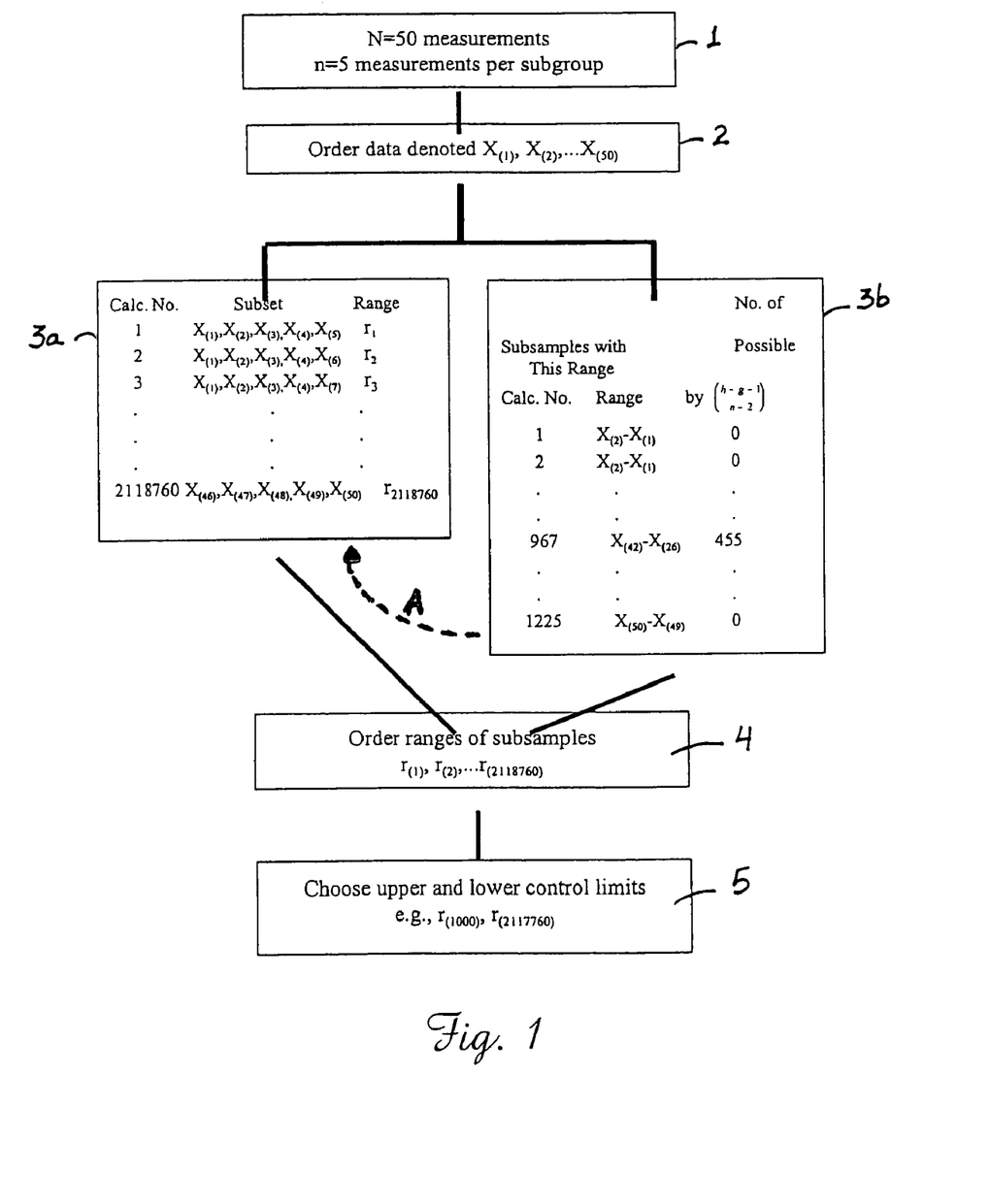
FIG. 1 is a flow chart depicting the method of the present invention for establishing a control limit for variability of a manufacturing process parameter using a jackknife control chart.

FIG. 1 schematically depicts one embodiment of the invention, wherein exact jackknife control limits for the range are calculated in accordance with the method of the present invention. From a datastream which forms a dataset having a non-normal distribution, 50 measurements (N=50) are taken (see Step 1). A subset size of 5 measurements (n=5) is selected. In Step 2, the data are then rank-ordered in ascending order, shown as $X_{(1)}, X_{(2)}, \ldots X_{(50)}$. As shown in Step 3a, the next step is to determine all possible combinations of subsets of the dataset wherein n=5. In this case, there are 2,118,760 possible combinations, depicted schematically as $r_1$ through $r_{2118760}$. In Step 3b, all possible numbers of subsamples of the dataset having the range defined by the subset (n=5) are calculated in accordance with the formula described above. In the example shown, a total of 1,225 subsample ranges are possible. The step of selecting a subset and calculating all possible numbers of subsamples of the dataset having the range defined by the subset may be repeated as necessary (shown as arrow A) until all possible numbers of ranges have been calculated for all possible subsets of the predetermined size within the dataset to define a set of ranges. The ranges are then rank-ordered in ascending order based on the calculated number of possible ranges (Step 4), and the upper and lower control limits are selected as a percentile of the rank-ordered ranges.

Other aspects of the present invention will become apparent to those skilled in this art from the following disclosure wherein there is shown and described a preferred embodiment of this invention, simply by way of illustration of one of the modes best suited to carry out the invention. As it will be realized, this invention is capable of other different embodiments and its several details are capable of modification in various, obvious aspects all without departing from the intended scope of the invention. Accordingly, the descriptions and examples herein will be regarded as illustrative in nature and not as restrictive.

EXAMPLE 1

Figure 2:
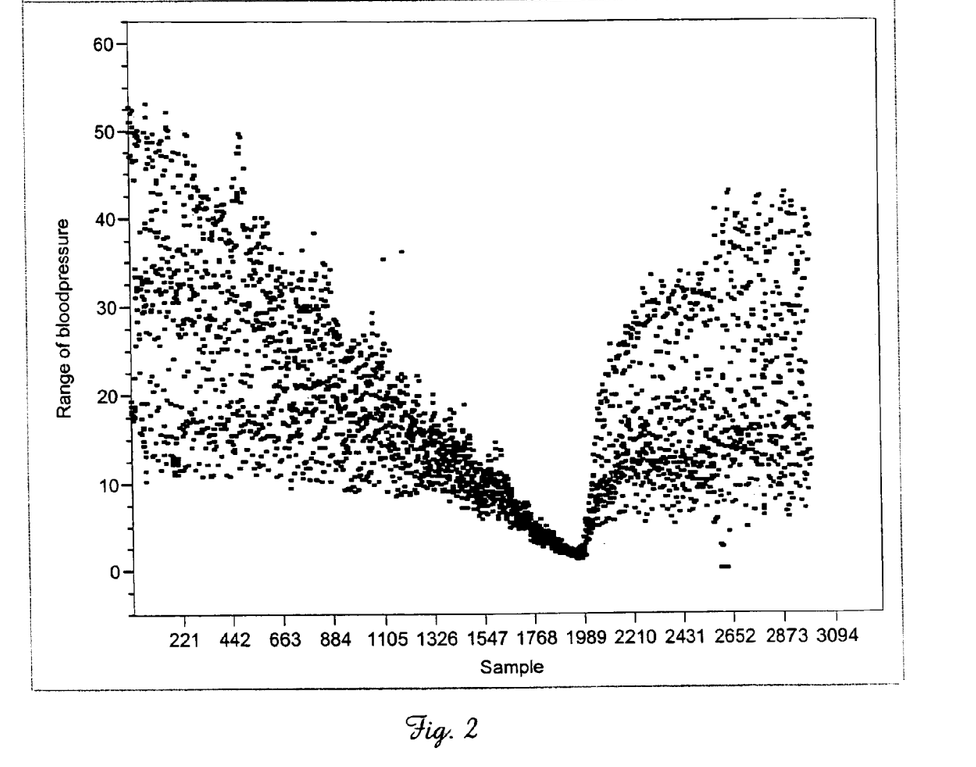
FIG. 2 is a scatter plot graphically depicting all possible five-point subsets of approximately 15,000 blood pressure measurements, showing a near loss of consciousness at approximately subsample 2000.

Approximately 15,000 blood pressure measurements were taken. The range of subsamples of size five are presented in scatter plot format in FIG. 2. It can be seen that the subject's blood pressure decreased to the point where the patient was nearly rendered unconscious at approximately subsample 2000.

Figure 3:
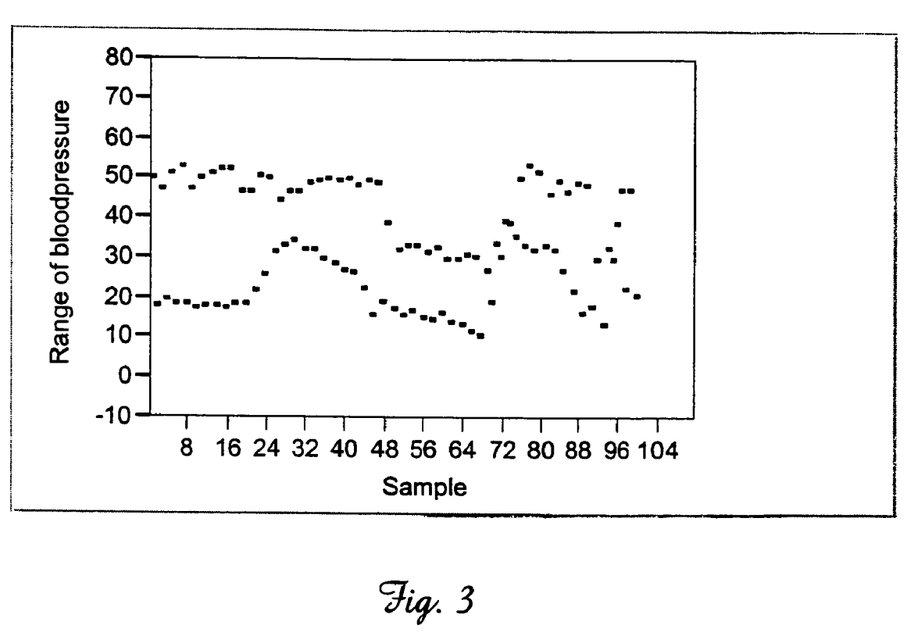
FIG. 3 graphically depicts the ranges of the first 100 subsamples of the dataset of FIG. 2.
Figure 4:
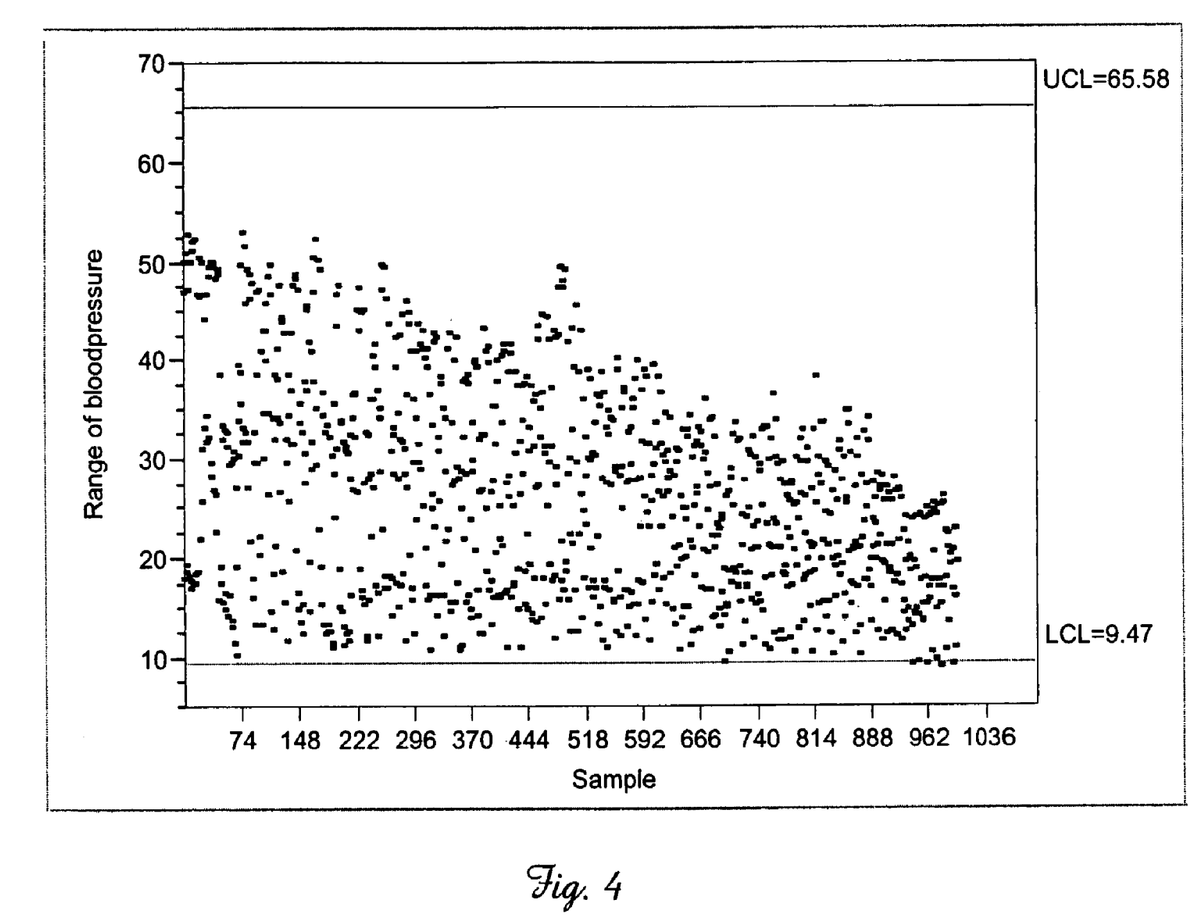
FIG. 4 is a control chart showing control limits established by conventional method.

Plotting the ranges of the first 100 subsamples provided no indication that the subject's blood pressure was likely to decrease in the future (FIG. 3). Accordingly, a control chart for the range method was attempted to allow prediction of a drop in a subject's blood pressure based on established control limits. As shown in FIG. 4, a control chart having control limits calculated by conventional methods did not detect the decrease in variability, represented as the range of the subsample dropping below 9.47, until subsample 980.

Figure 5:
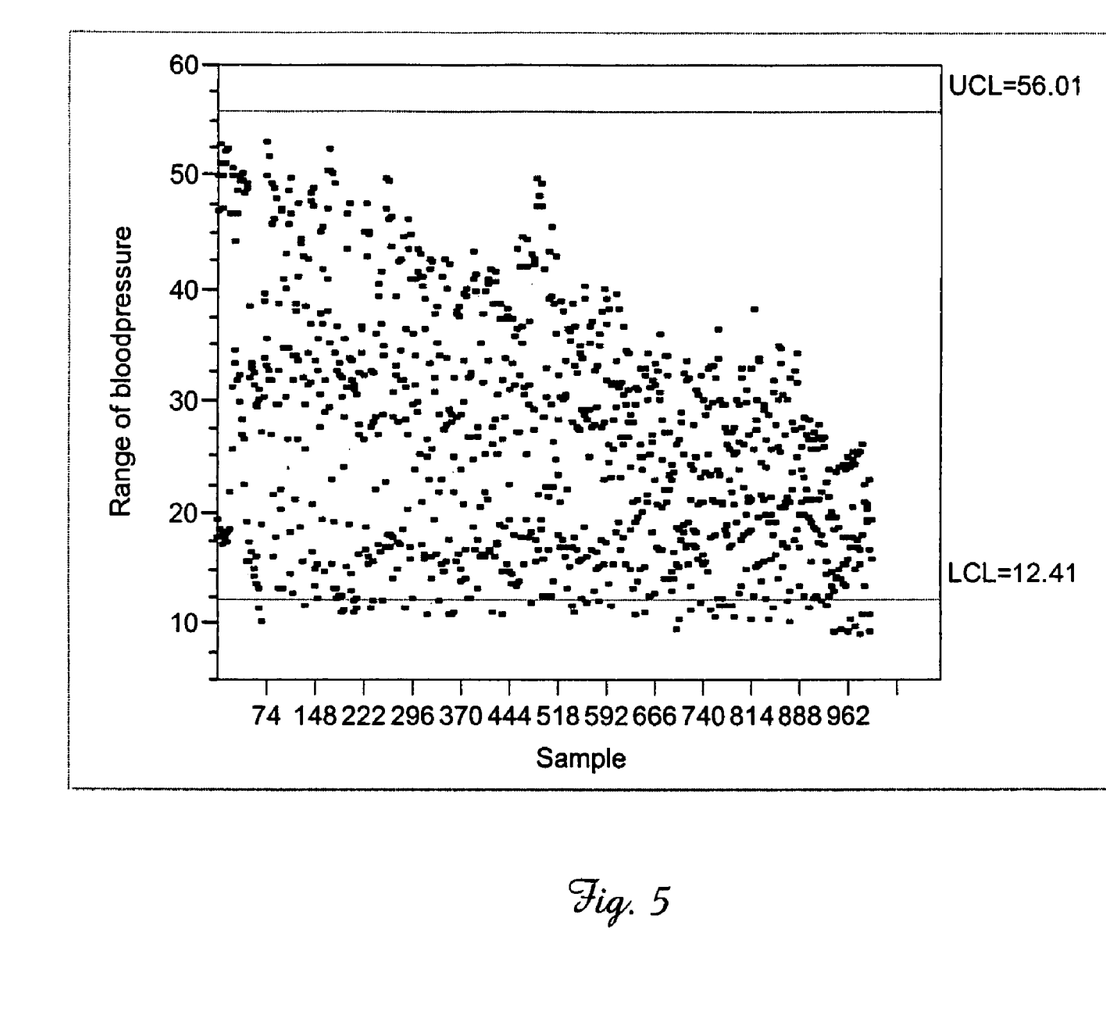
FIG. 5 is a control chart showing control limits established by the method of the present invention.

In FIG. 5, control limits for the control chart were established using the method of the present invention. It can clearly be seen that, in contrast to the conventional chart of FIG. 4, the decrease in variability in the range was detected almost immediately. Accordingly, a physician monitoring the patient would be able to predict when the patient's blood pressure might drop to potentially harmful levels, and would be able to take corrective action before the event rather than during or after.

EXAMPLE 2

Typically, increased body temperature is an indicator of possible infection in a patient following a surgical intervention. Body temperature measurements (range of subsamples of size k) collected incrementally from a patient over time after surgery are graphed, and the first p subsamples collected when infection is relatively uncommon are used to establish control limits as described in Example 1. As the subsequently measured body temperature values exceed the control limits of the control chart of the present invention much earlier than for a conventional control chart, an early indication or prediction of potential post-surgical infection is provided.

It will be appreciated that any parameter or variable indicative of a progression of a disease condition, or of a physiological condition or status of a patient, may be substituted for body temperature as in the present example, or for blood pressure as in Example 1 to predict downturns in patient status. Similarly, plotting improvements in parameters indicative of an ongoing disease situation, such as increasing white blood cell concentration in an HIV patient, on control charts having control limits established with the methods of the present invention may be used to monitor or predict improvement of the disease condition. Still further, parameters such as $VO_2$max can be used to predict decreases in optimal performance of a distance athlete. As long as the parameter is indicative of the condition being monitored, a predictive method is provided by the present invention.

EXAMPLE 3

The present method also finds application in a targeting and guidance control system, such as for a self-propelled projectile or missile. A self-propelled projectile is launched towards a target. In response, a second, guided missile is launched in an attempt to intercept and destroy the first. Personnel monitoring the first missile's course, speed, and the like, such as by radar or other known art methodology, are collecting a datastream representing the first missile's speed, altitude, spin, yaw, spatial positioning (e.g. Global Positioning Satellite coordinates), and the like. It would be desirable for changes in the missile's course, speed, etc. to be predicted rather than requiring actually observing an alteration in course, speed, and the like, followed by altering the second missile's course to match that of the first.

From collected data representing the measured speed or course of the first missile over time, p subsamples of size k are used to establish range control limits as described in the foregoing description. As the parameter being measured falls outside the established control limits, indicating a change in course or speed of the first missile, early appropriate corrective measures may be applied to the speed or course of the second missile to match that of the first. By using predicted changes in the speed or course of the first missile (rather than waiting until actual changes are visually observed) to make appropriate corrections to the second missiles speed/course, an advantage is gained.

EXAMPLE 4

The actual value of a foreign currency in comparison to the U.S. dollar at the close of business markedly affects profits of businesses operating on a global basis. Often, the percentage error in a daily currency value forecast is compared to actual close of a currency value. This provides a datastream which may be analyzed. Conventionally, moving average forecast errors for a currency for a week are plotted daily. Standard moving average control charts are well-suited to detect positive or negative trends in this parameter.

Banks use algorithms to predict the daily closing value of currency (for example, the Euro) compared to the U.S. dollar. If, for example, the algorithm predicts increasing Euro value one day, but the value of the Euro compared to the dollar decreases, and the algorithm predicts a decreasing Euro value the next day but the value increases, on average the algorithm appears satisfactory. However, the range indicates that the algorithm is not predictive. Data are collected representing percent error in the forecast provided by the algorithm for 30 days. All possible 5 day ranges of the data and the sensitivity (i.e., the acceptable number of false positives) required by the bank management are used to compute range control limits as described above. Each day, the range of the last five trading days is plotted on the chart so established. An excessive range indicates excessive variability in the algorithm, requiring adjustment and allowing correction before an actual error occurs. Of course, currency closing value may be replaced by any economic indicator which fluctuates over time, allowing use of the method of the present invention as a useful economic forecaster.

It will be appreciated that the method of the present invention may be embodied in any of a number of means known in the art. For example, the method may be carried out using computer executable instructions as part of computer readable media. When described in the context of computer readable media having computer executable instructions stored thereon, it is denoted that the instructions may include program modules, routines, programs, objects, components, data structures, and patterns that perform particular tasks or implement particular abstract data upon or within various structures of the computing environment. Executable instructions exemplarily comprise instructions and data which cause a general purpose computer, special purpose computer, or special purpose processing device to perform a certain function or group of functions, such as those comprising the methods of the present invention as described in the foregoing description and examples.

It will further be appreciated that any suitable dataset will serve in the method of the present invention, as the calculations are not bound by assumptions of normality and the calculated ranges of the present method accurately represent the data. For example, a communications satellite emits a quality control signal. If the quality control signal indicates a problem with the signal transmission, corrective action is required. For example, a sunspot may interfere intermittently with a satellite signal transmission. A conventional control chart plotting signal transmission quality may fail to detect the problem because the problem is signal variability, not signal strength. Plotting signal variability as the parameter measured and establishing control limits in accordance with the preceding examples allows predicting impending variation in signal quality and taking corrective actions prior to variation in the signal quality.

The foregoing description is presented for purposes of illustration and description of the various aspects of the invention. The descriptions are not intended to be exhaustive or to limit the invention to the precise form disclosed. The embodiments described above were chosen to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A computer implemented method for detecting or predicting a deviation in variability of at least one parameter being monitored, comprising:

measuring the at least one parameter incrementally to create a dataset having a plurality of datapoints, wherein each datapoint represents an individual measured value for the parameter;

rank-ordering the datapoints within the dataset;

selecting at least one subset of the dataset, wherein the at least one subset is a predetermined number of datapoints including a high measured value and a low measured value defining a range of measured parameter values;

calculating all possible numbers of a subsample of the dataset having the range defined by the at least one subset in accordance with the formula:

$$\binom{h-g-1}{n-2}$$

where h is a highest measured value within the range, g is a lowest measured value within the range, and n is a number of observations within the subset;

repeating the steps of selecting at least one subset and calculating all possible numbers of subsamples of the dataset having the range defined by the at least one subset, until all possible numbers of ranges have been calculated for all possible subsets having the predetermined number of datapoints within the dataset to define a set of ranges;

rank-ordering the defined set of ranges; and establishing a control limit for the at least one parameter, the control limit being defined by an upper limit and a lower limit wherein the upper and lower limits are a predetermined percentile of the rank-ordered set of ranges.

2. The method of claim 1, further including the step of monitoring a subsequently measured parameter value to determine when the subsequently measured parameter falls outside the established control limit.

3. The method of claim 1, wherein the parameter is measured incrementally over a predetermined time period.

4. The method of claim 1, wherein the parameter is measured incrementally over a distance.

5. The method of claim 1, wherein the control limit is established using a jackknife method.

6. The method of claim 1, wherein the control limit is established using a bootstrap method.

7. The method of claim 1, wherein the relationship between the highest measured value and the lowest measured value in a range is defined by the equation g=h where h is the highest measured value within a range and g is the lowest measured value within a range.

8. The method of claim 1, wherein the relationship between the highest measured value and the lowest measured value in a range is defined by the equation g=h−1 where h is the highest measured value within a range and g is the lowest measured value within a range, and the control limits are defined by the range of $2^n-2$ subsets, where n is the number of observations within the subset.

9. The method of claim 1, wherein the relationship between the highest measured value and the lowest measured value in a range is defined by the equation g<h−1 where h is the highest measured value within a range and g is the lowest measured value within a range, and the possible numbers of a subsample of the dataset having the range defined by the subset are calculated in accordance with the formula:

$$\sum_{c=1}^{n-1}\sum_{d=1}^{n-c}\binom{n}{c}\binom{n-c}{d}(h-g-c-d+1)^{n-c-d}$$

where n is the number of observations within the subset, c is the number of times the lowest measured value appears in the subset, and d is the number of times the highest measured value appears in the subset.

* * * * *